United States Patent [19]
Lacombe et al.

[11] Patent Number: 6,026,495
[45] Date of Patent: Feb. 15, 2000

[54] NONINTRUSIVE MONITORING OF A COMPUTER SYSTEM'S DOWNTIME DUE TO A SUPPLY POWER OUTAGE CONDITION

[75] Inventors: John S. Lacombe, Tomball; Peter M. Yee, Houston; Rene R. Gaudet, Cypress; Robert Van Cleve, The Woodlands, all of Tex.

[73] Assignee: Compaq Computer Corporation, Houston, Tex.

[21] Appl. No.: 08/987,625

[22] Filed: Dec. 9, 1997

[51] Int. Cl.[7] .............................. G06F 1/00; G06F 15/16
[52] U.S. Cl. ............................................. 713/340; 709/224
[58] Field of Search ................................... 713/300, 340; 714/14, 22; 709/223, 224

[56] References Cited

U.S. PATENT DOCUMENTS

| | | | |
|---|---|---|---|
| 4,466,074 | 8/1984 | Jindrick et al. | 364/569 |
| 4,611,289 | 9/1986 | Coppola | 364/492 |
| 4,783,755 | 11/1988 | Blanchard et al. | 364/569 |
| 5,123,017 | 6/1992 | Simpkins et al. | 371/15.1 |
| 5,327,349 | 7/1994 | Hoste | 364/468 |
| 5,745,693 | 4/1998 | Knight et al. | 395/200.54 |
| 5,790,431 | 8/1998 | Ahrens, Jr. et al. | 364/569 |
| 5,825,648 | 10/1998 | Karnowski | 364/187 |
| 5,841,964 | 11/1998 | Yamaguchi | 395/113.21 |

*Primary Examiner*—Ayaz R. Sheikh
*Assistant Examiner*—Jigar Pancholi
*Attorney, Agent, or Firm*—Konneker & Smith, P.C.

[57] ABSTRACT

A nonintrusive monitoring system is used to determine the onset and duration times of an electrical power outage-caused down condition of a computer without requiring a pre-power outage polling of a running component of the computer and thereby degrading computer system performance. In response to a supply power outage the monitoring system switches on a battery-powered counter device, representatively a digital counter or a real time clock, and then switches the counter device back off in response to resumption of power supply to the computer. A software portion of the monitoring system then detects the count value of the counter device, and utilizes the count value to compute the onset and duration times of the previous power outage. Using an alternative nonintrusive technique, the monitoring system permits the counter device to run during power supply to the computer, while using the computer system clock to generate periodic time stamps, and disables the counter device during computer supply power outages. Upon resumption of supply power to the computer, the monitoring system compares the time stamp information to the count value to determine the onset and duration times of the previous supply power outage.

30 Claims, 5 Drawing Sheets

NONINTRUSIVE MONITORING OF A COMPUTER SYSTEM'S DOWNTIME DUE TO A SUPPLY POWER OUTAGE CONDITION

BACKGROUND OF THE INVENTION

1. Field of the Invention

The present invention generally relates to computer apparatus and, in a preferred embodiment thereof, more particularly relates to the monitoring of a computer system's downtime due to an interruption in the electrical power supply to the system.

2. Description of Related Art

Particularly in the arena of networked computer systems it is desirable to be able to accurately determine, over a given time period, when a particular computer went "down", how long it was down, and why it went down. A computer-down condition may arise for a variety of reasons including user shut-off, a variety of error-caused shutdowns created by the computer's operating system, a shutdown automatically initiated in response to a sensed hardware failure, an automatic shutdown arising from a sensed thermal overload condition, and an outage of the electrical power supplied to the computer.

At the present time, software can be used to detect and "capture" information relating to all of these computer shutdown conditions with the exception of the power loss shutdown. The conventional method of tracking a computer's power loss shutdown is to continually "poll" some nonvolatile storage portion of the computer (such as the hard disk drive, NVRM or CMOS) to obtain, during operation of the computer, a "still running" time-stamped record which may be later used to determine the computer down time attributable to a power outage condition.

As is well known, however, this conventional requirement of repeatedly gaining polling access to, for example, the hard drive portion of a running computer to later determine when the computer was down due to a power outage typically intrudes upon the computer system to an extent which appreciably degrades its performance. It can thus readily be seen that a need exists for a nonintrusive technique for tracking a computer's downtime attributable to a power outage condition. It is to this need which the present invention is directed.

SUMMARY OF THE INVENTION

In carrying out principles of the present invention, in accordance with a preferred embodiment thereof, the CPU unit of a computer system is provided with a power outage monitoring system which determines and retrievably stores CPU power outage information, representatively the onset and duration times for such power outages. According to a key advantage provided by the present invention the monitoring system, in a preferred embodiment thereof, is a nonintrusive system in that it performs its monitoring functions without utilizing the system performance-degrading conventional monitoring technique of polling a nonvolatile storage portion of the computer during operative periods thereof.

From a broad perspective, the nonintrusive monitoring system operates by generating an incrementing count value during a selected one of the operating and power outage states of the computer and then determines the count value and uses it to compute and generate the desired computer downtime information during a subsequent one of the operating and power outage states of the computer.

In a preferred embodiment thereof, the monitoring system includes a counter device having an on state during which it generates the incrementing count value, and an off state during which the count value remains constant. Preferably, the counter device is a software-controlled digital counter which is energized during the power outage state of the computer. Alternatively, the counter device may be a software-controlled real time clock, and the counter device may be energized during an operating state of the computer.

First means, responsive to a CPU unit operating power outage, are provided for changing the state of the counter device from a selected first one of its on and off states to the other of its on and off states. Additionally, second means, responsive to a resumption in CPU unit operating power supply, are provided for changing the state of the counter device back to the first one of its on and off states, determining the count value of the counter device, and using the determined count value to generate the desired CPU unit power outage downtime information.

Preferably, the counter device is electrically operable, and the first means include power supply means for supplying electrical power to the counter device only during an outage of electrical operating power to the CPU unit. In a preferred embodiment thereof, the power supply means include a battery coupled to the counter device for supplying electrical operating power thereto, and switch means for preventing the battery from supplying electrical operating power to the counter device while electrical operating power is being supplied to the CPU unit, and permitting the battery to supply electrical operating power to the counter device in response to an outage of electrical operating power to the CPU unit.

DETAILED DESCRIPTION

Figure 1:
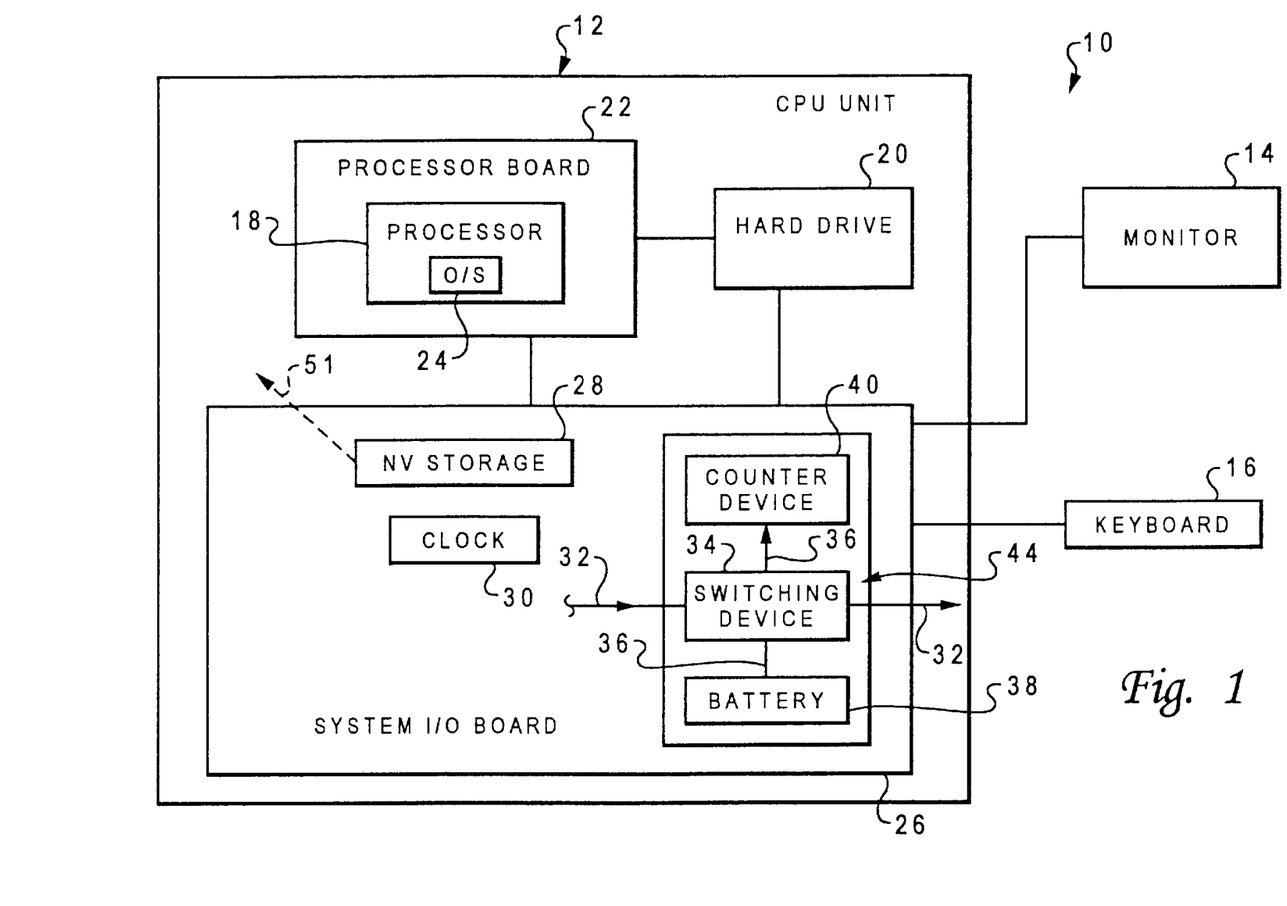
FIG. 1 is a partial schematic block diagram of a representative computer system incorporating therein a specially designed nonintrusive power outage downtime monitoring system embodying principles of the present invention.

Schematically depicted in FIG. 1 is a portion of a representative computer system 10 that includes a CPU unit 12, a monitor 14 and a keyboard 16. The CPU unit has a processor 18 and a data storage device, representatively a hard disk drive 20, from which data may be retrieved by the processor. Processor 18 is mounted on a processor board 22 and operatively associated with an operating system (O/S) 24. As illustrated, the hard disk drive 20 and the processor board 22 are operatively coupled to one another and to a system I/O board 26 having a nonvolatile data storage area 28 thereon. Representatively, this nonvolatile data storage area 28 is an NVRAM area, but could alternatively be another type of nonvolatile storage device such as EPROM or CMOS. The CPU unit 12 also has provided therein a conventional system clock 30 which is capable of generating time stamps for purposes later described herein.

Main electrical power is supplied to the CPU unit 12 via a main electrical power line 32 in which a schematically depicted switching device 34 is interposed. The switching device 34 is also interposed in a secondary electrical lead 36 coupled between an electrical storage battery 38 and a specially designed counter device 40 mounted on the system I/O board 26.

Together with suitable system drivers 42 (see FIG. 2) associated with the operating system 24 as later described herein, the switching device 34, the battery 38, and the counter device 40 form a unique nonintrusive system 44 that may be used to accurately track down-time periods of the computer system 10 occasioned by loss of electrical power (via lead 32) to the CPU unit 12. System 44 is characterized herein as a "nonintrusive" power outage down-time monitoring system because it advantageously performs its monitoring function without the continuous, performance degrading access and polling of a nonvolatile storage portion (such as the disk drive 20) of the CPU unit 12 associated with conventional power outage monitoring systems.

Figure 2:
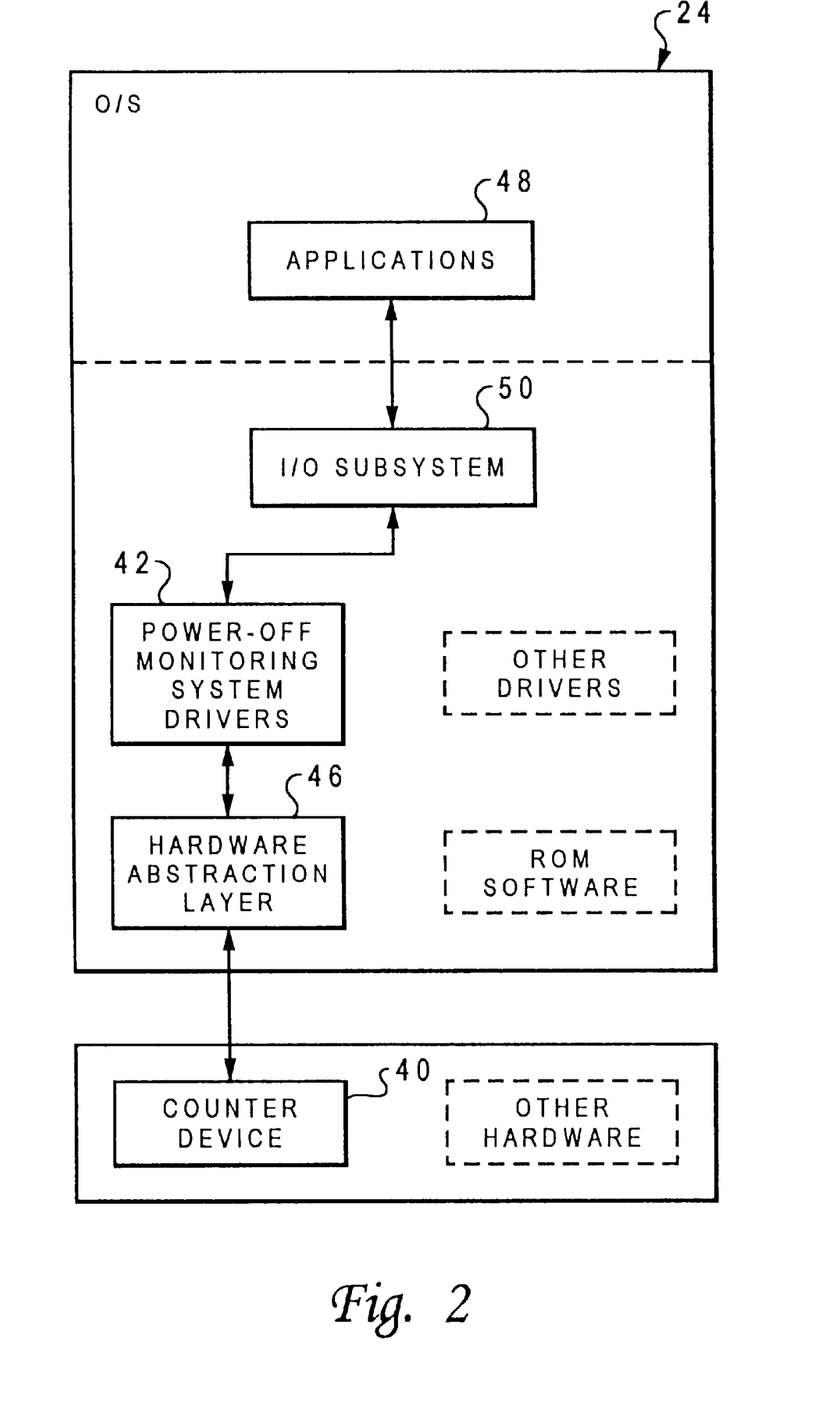
FIG. 2 is a partial block diagram of the computer's operating system.

Referring now to FIG. 2, in which a portion of the operating system 24 is shown in schematic block diagram form, the counter device 40 is linked, via a hardware abstraction layer portion 46 of the operating system 24, to the power-off monitoring system drivers 42. In turn, the system drivers 42 are operatively linked to the applications section 48 of the operating system 24 via the indicated I/O subsystem portion 50 thereof.

The counter device 40 (see FIG. 1) is a programmed hardware device of, for example, the PAL (programmable array of logic) or ASIC (application specific integrated circuit) type in which the counting hardware portion of the device is preferably a digital counter controlled by the built-in logic of the overall device 40 as later described herein. Alternatively, the counting hardware portion of the device could be a real time clock.

During operational periods of the FIG. 1 CPU unit 12, with electrical power being supplied thereto via lead 32, the monitoring system 44 in its preferred embodiment is essentially dormant and, as mentioned above, is not accessing and polling any other portion of the CPU unit 12. Thus, in contrast to conventional power outage downtime monitoring systems, the system 44 does not degrade the performance of the computer system 10.

When current flows through the main power supply lead 32 the switching device 34 functions as a normally open switch in the auxiliary power lead 36, preventing current flow therethrough from the battery 38 to the counter device 40. When a power outage occurs during operation of the CPU unit 12, and current flow through lead 32 terminates, the switching device 34 automatically closes the lead 36 circuit path between the battery 36 and the counter device 40. As subsequently described herein, the counter device 40 is then permitted to run until main power is restored to the CPU unit 12 via the lead 32 at which time the operation of the counter device is terminated. Its accumulated count is stored in the NV storage area 28, and is subsequently retrieved (as indicated by the dashed arrow 51 in FIG. 1) and converted to a time value representative of the system down time attributable to the electrical power outage.

Figure 3:
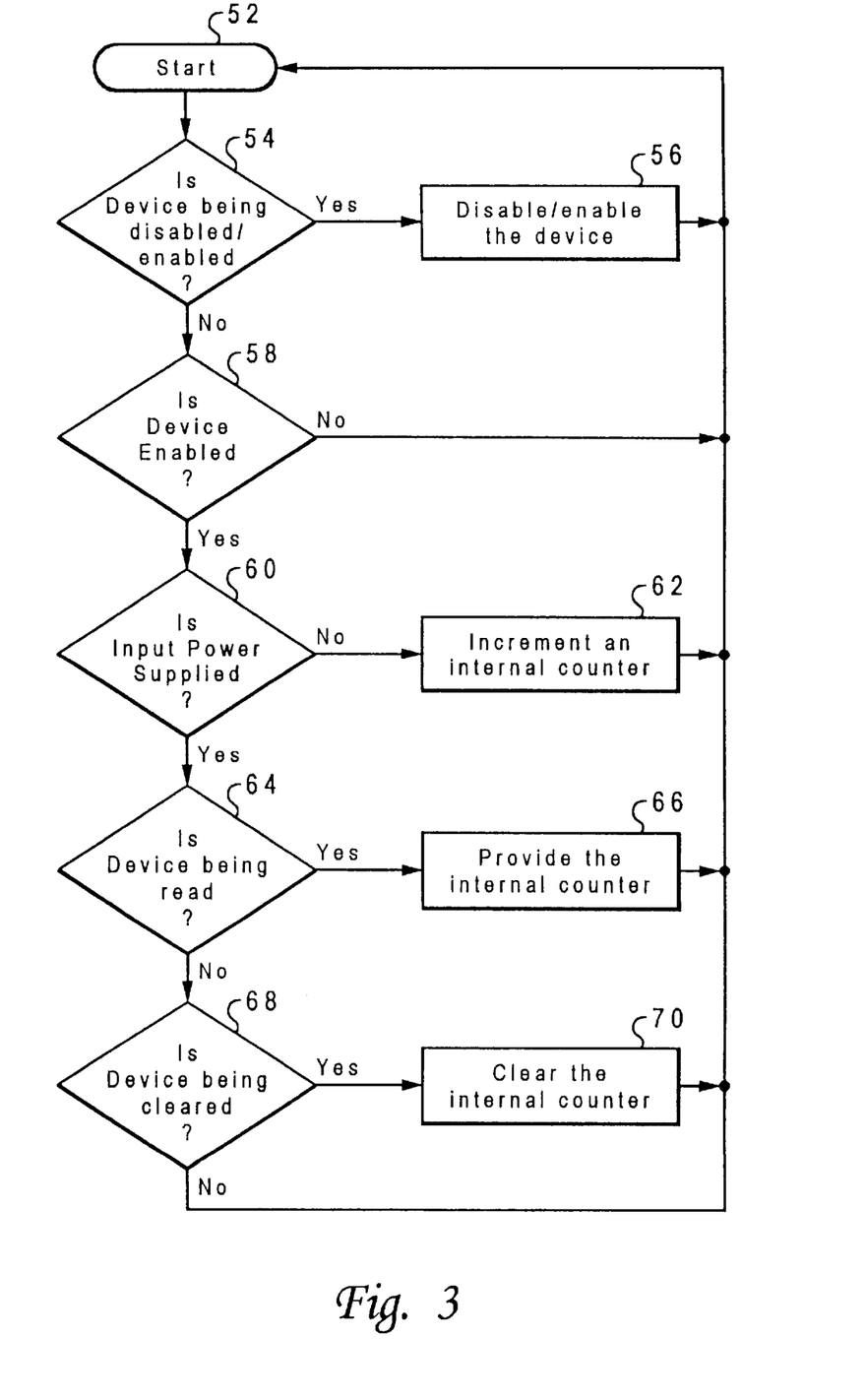
FIG. 3 is a logic flow diagram schematically illustrating the control of a counter device portion of the monitoring system.

FIG. 3 is a schematic logic flow diagram of the operation of the software portion of the counter device 40. Subsequent to the initiation of the counter device software program at step 52, a query is made at step 54 as to whether a call is being made for disablement or enablement of the counter device 40. If it is, the counter device 40 is appropriately disabled or enabled at step 56. If it is not, a determination is made at step 58 as to whether the counter device 40 has been enabled.

If counter device 40 has not been enabled, the routine simply loops through steps 52,54 and 58 until device 40 has been enabled, at which point a query is made at step 60 as to whether system input power is being supplied. If it is not, at step 62 the counter device 40 is permitted to increment until system input power is restored. Upon restoration of system input power a query is made at step 64 as to whether the counter device 40 is being read (for purposes of determining the previous power outage downtime of the computer system 10). If the counter device 40 is being read, its count is provided at step 66, and if the counter device 40 is not being read a determination is made at step 68 as to whether a request has been received to clear the counter device 40. Upon determining that the counter device 40 is to be cleared it is cleared at step 70. If the counter device 40 is not to be cleared, the counter device software program returns to its starting step 52 as indicated.

Figure 4:
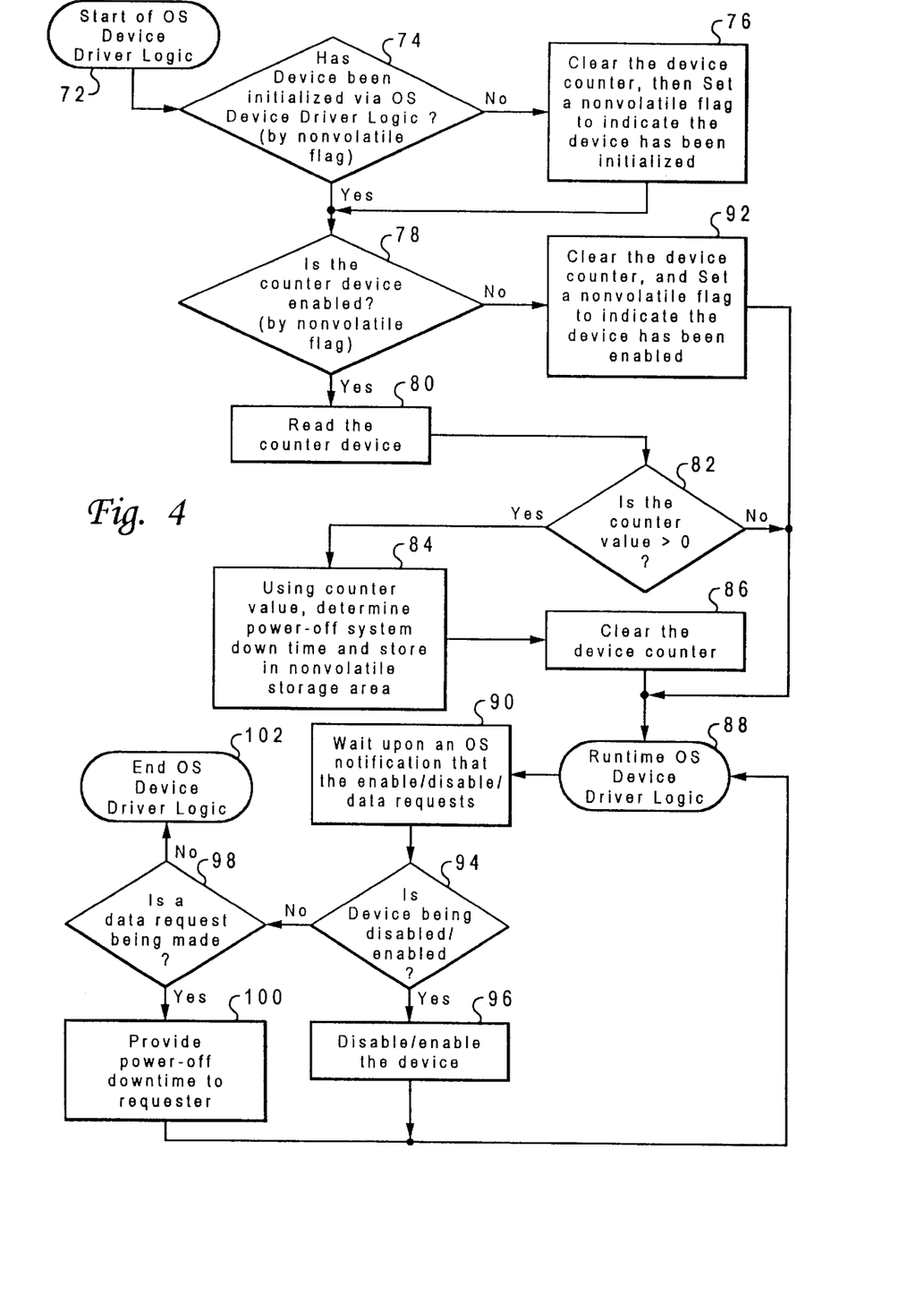
FIG. 4 is a logic flow diagram schematically illustrating the use of the counter device in an overall system power outage downtime monitoring method of the present invention.

The use of the counter device 40 by the nonintrusive monitoring system 44 is schematically illustrated in the schematic logic flow diagram of FIG. 4. Subsequent to the start of the O/S device driver logic (i.e., the drivers 42 schematically shown in FIG. 2) at step 72, a query is made at step 74 as to whether the counter device 40 has been initialized via the O/S device driver logic (by a nonvolatile flag). If such initialization has not occurred, the counter device 40 is cleared at step 76, and a nonvolatile flag is set to indicate that the counter device 40 has been initialized, and a subsequent transfer is made to step 78. If in step 74 the determination is made that the counter device 40 has been initialized a direct transfer to step 78 is effected.

A query is made at step 78 as to whether the counter device 40 has been enabled (by the nonvolatile flag). If such enablement it detected, the counter device 40 is read at step 80 and, if the counter value is determined at the ensuing step 82 to be greater than zero, the power-off down time of the computer system 10 is determined at step 84 using the counter value (in a manner subsequently described herein), and the system down time is stored in the nonvolatile storage area 28 (see FIG. 1) for subsequent retrieval. The counter device 40 is then cleared at step 86, and the program transfers to step 88 which initiates the run-time mode of the O/S device driver logic. In the next step 90 the monitoring system 44 enters an idle mode while awaiting a request to enable/disable the counter device 40 or to retrieve the down time data.

If it is determined at the prior step 78 that the counter device 40 has not been enabled by a nonvolatile flag the counter device 40 is cleared at step 92 which also sets a nonvolatile flag to indicate that the counter device 40 has been enabled. It is important to note that this nonvolatile flag may be set asynchronously with the execution of the illustrated FIG. 4 logic path, and is considered to be either user of O/S device driver controllable. If it is determined at step 82 that the counter device count is not greater than zero a direct transfer is made to step 88.

If, at step 94 a request to disable/enable the counter device 40 is received, the corresponding disablement/enablement of the counter device 40 is effected at step 96 and a transfer is made back to step 88. If the counter device 40 is enabled, and a data request is received at step 98, the previously computed system power-off downtime stored in the NV storage area 28 (see FIG. 1) is retrieved and provided to the requester at step 100, and a transfer is made to step 88. As illustrated, if the answers to the queries at steps 94 and 98 are both "no", the routine ends at step 102.

Figure 5:
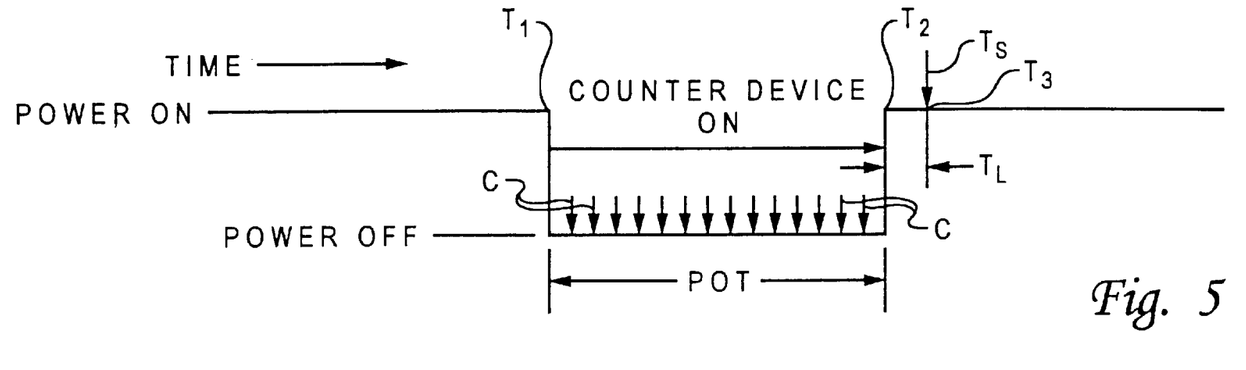
FIG. 5 is a simplified schematic timeline diagram illustrating the conversion of the counter device reading to a corresponding system power outage downtime value.

The method used to determine the actual power-off time (POT) in step 84 of the logic flow diagram of FIG. 4 is illustrated in the schematic time line chart of FIG. 5 in which it is assumed that the hardware portion of the counter device 40 is a digital counter. As previously mentioned, during the power-on time interval at the left end of the FIG. 5 chart there is no electrical power being supplied to the counter device from its associated battery 38 (see FIG. 1). The count of the device 40 is thus not incrementing during this initial power-on period.

At the initiation of a system power outage (i.e., at time $T_1$) the switching device 34 (see FIG. 1) permits battery power to be transmitted to the counter device 40 which responsively begins to generate counts C. When the main system power comes back on, at time $T_2$ in FIG. 5, the switching device 34 terminates battery power to the counter device 40, thus also terminating the generation of the counts C. In response to the resumption of power supply to the CPU unit 12 a time stamp TS is generated by the system clock 30 at time $T_3$ which is subsequent to the power-on resumption time $T_2$ by a determinable time interval $T_L$ which is a "lag" time between the actual resumption of system power and the creation of the time stamp TS.

Since time $T_3$ is known, via the time stamp TS, and there is a known count-per-time interval value associated with the digital counter portion of the counter device 40, the nonintrusive monitoring system 44 is simply programmed to convert the detected number of counts C to a time interval which is equal to the power of f time POT. By simply adding the lag time interval $T_L$ to the determined power-off time interval POT and subtracting this time interval sum from $T_3$, $T_1$ (i.e., the onset time of the power outage) is also accurately determined by the monitoring system 44.

As previously mentioned, the counting portion of the counter device 40 is representatively a digital counter, but could also be another type of controllable counting device such as, for example, a real time clock. If a real time clock is substituted for a digital counter in the illustrated method shown in FIG. 5, the POT interval may be determined directly without a need for the monitoring system 44 to perform the previously described count-to-time conversion.

As can be seen from the foregoing, the nonintrusive monitoring function of the system 44 is carried out by automatically switching a counter device from one of its available on/off states to the other state in response to a sensed power outage, switching the counter device back to its original on/off state in response to power supply resumption, reading the counter device after power supply resumption, and subsequently using the counter device reading to determine (1) the duration of the power outage and (2) the onset time of the power outage.

In FIG. 5 the counter device 40 was switched from its "off" state to its "on" state in response to a CPU unit power supply outage, and then back to its "off" state in response to power supply resumption. However, the nonintrusive power-off monitoring principles of the present invention can also be advantageously implemented (with corresponding minor revisions to the monitoring program software routine) by switching the counter device 40 off in response to a power supply outage, and then switching it back on in response to a resumption in power supply, as schematically depicted in the time line chart of FIG. 6.

Figure 6:
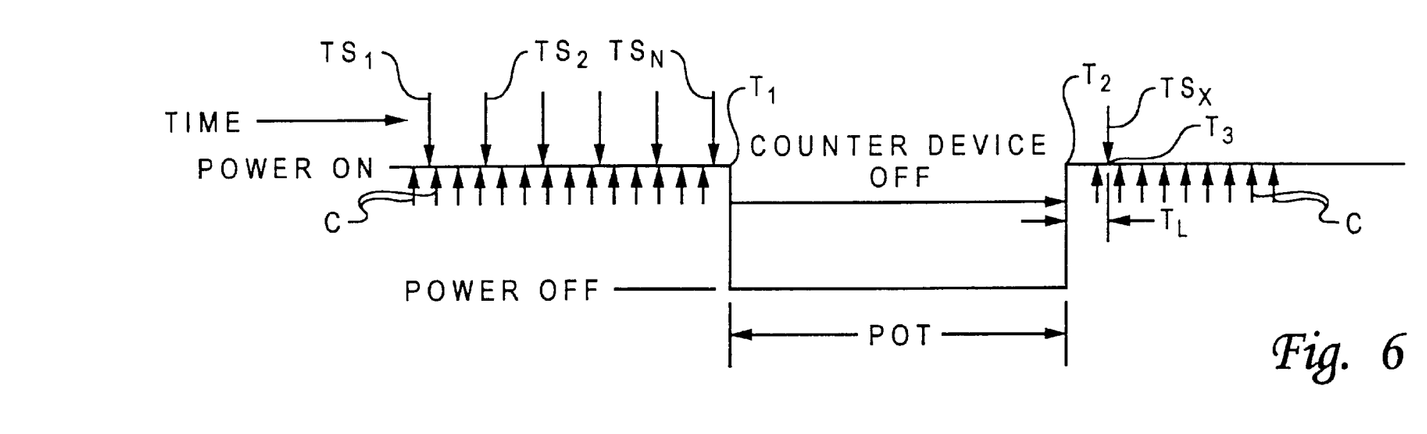
FIG. 6 is a simplified schematic timeline diagram illustrating an alternate technique for utilizing the counter device to determine system power outage downtime.

To describe the power-off interval and power outage onset time determination method shown in FIG. 6 it will be initially assumed again that the counting portion of the counter device 40 is a digital counter. During the initial power-on interval at the left end of the FIG. 6 chart, the counter device 40 is in its "on" state and continuously generating counts C. Using this modified control of the counter device 40 the battery 38 and the switching device 34 (see FIG. 1) are eliminated, and electrical power fed to the CPU unit 12 via the lead 32 may be appropriately converted and sent to the counter device 40 in a manner such that when the CPU unit 12 loses power so does the counter device 40.

At the same time the counts C are being generated, the system clock 30 is being controlled to generate sequential time stamps $TS_1$–$TS_N$, at predetermined intervals, during the initial power-on period. At the onset of the supply power outage the generation of both the time stamps TS and the counts ceases, with the last-generated time stamp being time stamp $TS_N$. Upon resumption of power supply to the CPU unit 12, at time $T_2$, the generation of the counts C and the time stamps TS automatically resumes, with the first-generated time stamp being time stamp $TS_X$. This first time stamp $TS_X$ is generated at time $T_3$ after the time lag interval $T_L$ after power supply resumption.

In this case, the total counter device "count" at time $T_3$ is known, and is compared by the monitoring system program to the count value which would exist at time $T_3$ if a power outage had not occurred. Using the known count-per-time interval value the monitoring system simply converts the count discrepancy at time $T_3$ to a corresponding time interval from which the time lag interval $T_L$ is subtracted to arrive at the duration of the power-off time POT and the power outage time $T_1$. In a manner similar to that in the FIG. 5 method, if a real time clock is utilized as the counting portion of the counter device 40 in the FIG. 6 method, this count-to-time conversion step is eliminated, and the POT interval and the power outage onset time $T_1$ directly determined by the monitoring system software.

The foregoing detailed description is to be clearly understood as being given by way of illustration and example only, the spirit and scope of the present invention being limited solely by the appended claims.

What is claimed is:

1. A computer system comprising:
   a CPU unit adapted to receive electrical operating power from a source thereof, said CPU unit including a processor and a data storage device from which data may be retrieved by said processor; and
   a monitoring system for monitoring CPU power outages, said monitoring system including:
   a counter device having an on state during which it generates an incrementing count value, and an off state during which said count value remains constant,
   first means, responsive to a CPU unit operating power outage, for changing the state of said counter device from a selected first one of said on and off states to the other of said on and off states, and
   second means, responsive to a resumption in CPU unit operating power supply, for changing the state of said counter device back to said first one of said on and off states, determining the count value of said counter device, and using the determined count value to generate CPU unit power outage downtime information.

2. The computer system of claim 1 wherein said power outage downtime information includes the onset time of the previous power outage.

3. The computer system of claim 1 wherein said power outage downtime information includes the duration time of the previous power outage.

4. The computer system of claim 3 wherein said power outage downtime information further includes the onset time of the previous power outage.

5. The computer system of claim 1 wherein said counter device includes a digital counter portion.

6. The computer system of claim 1 wherein said counter device is a software-controlled digital counter.

7. The computer system of claim 1 wherein said counter device includes a real time clock portion.

8. The computer system of claim 1 wherein said counter device is a software-controlled real time clock.

9. The computer system of claim 1 wherein said first one of said on and off states of said counter device is said off state thereof.

10. The computer system of claim 9 wherein:
said counter device is electrically operable, and
said first means include power supply means for supplying electrical power to said counter device only during an outage of electrical operating power to said CPU unit.

11. The computer system of claim 1 wherein:
said CPU unit has a system clock operative to generate a time stamp subsequent to said resumption in CPU unit operating power supply, and
said second means are operative to use the determined count value to generate said CPU power outage downtime information by correlating in a predetermined manner the determined count value with the time value of said time stamp.

12. A computer system comprising:
a CPU unit adapted to receive electrical operating power from a source thereof, said CPU unit including a processor and a data storage device from which data may be retrieved by said processor; and
a monitoring system for monitoring CPU power outages, said monitoring system including:
an electrically operable counter device having an on state during which it generates an incrementing count value, and an off state during which said count value remains constant,
first means, responsive to a CPU unit operating power outage, for changing the state of said counter device from said on state to said off state, said first means including power supply means for supplying electrical power to said electrically operable counter device only during an outage of electrical operating power to said CPU unit, said power supply means including:
a battery coupled to said counter device for supplying electrical operating power thereto, and
switch means for preventing said battery from supplying electrical operating power to said counter device while electrical operating power from said source thereof is being supplied to said CPU unit, and permitting said battery to supply electrical operating power to said counter device in response to an outage of electrical operating power to said CPU unit, and second means, responsive to a resumption in CPU unit operating power supply, for changing the state of said counter device back to said on state, determining the count value of said counter device, and using the determined count value to generate CPU unit Dower outage downtime information.

13. The computer system of claim 1 wherein said first one of said on and off states of said counter device is said on state thereof.

14. Computer apparatus comprising:
a CPU unit adapted to receive electrical operating power from a source thereof, said CPU unit being in an operating state during receipt of said electrical operating power, and in a power outage state during an outage of said electrical operating power, said CPU unit further having at least one nonvolatile storage device; and
a nonintrusive power outage monitoring system for generating CPU unit power outage downtime information without polling any of said at least one nonvolatile storage device during said operating state of said CPU unit, said monitoring system being operative to generate an incrementing count value during a selected one of said operating and power outage states and then determine said count value and use it to compute and generate said downtime information during a subsequent one of said operating and power outage states.

15. The computer apparatus of claim 14 wherein:
said CPU unit has a system clock operative to generate a time stamp subsequent to said CPU unit being returned to said operating state from said power outage state, and
said nonintrusive power outage monitoring system is operative to compute and generate said downtime information by correlating in a predetermined manner the determined count value with the time value of said time stamp.

16. A computer system comprising:
a CPU unit adapted to receive electrical operating power from a source thereof, said CPU unit including a processor and a data storage device from which data may be retrieved by said processor; and
a monitoring system for monitoring CPU power outages, said monitoring system including:
an electrically operable, software-controlled counter device having an on state during which it generates an incrementing count value, and an off state during which said count value remains constant,
first means, responsive to a CPU unit operating power outage, for changing the state of said counter device from said off state to said on state, said first means including power supply means for supplying electrical power to said counter device only during an outage of electrical operating power to said CPU unit, and
second means, responsive to a resumption in CPU unit operating power supply, for changing the state of said counter device back to said off state, determining the count value of said counter device, and using the determined count value to generate CPU unit power outage downtime information indicative of the onset and duration times of the previous power outage,
said power supply means including:
a battery coupled to said counter device for supplying electrical operating power thereto, and
switch means for preventing said battery from supplying electrical operating power to said counter device while electrical operating power from said source thereof is being supplied to said CPU unit, and permitting said battery to supply electrical operating power to said counter device in response to an outage of electrical operating power to said CPU unit.

17. The computer system of claim 16 wherein said counter device is an electrically operable software-controlled digital counter.

18. The computer system of claim 16 wherein said counter device is an electrically operable software-controlled real time clock.

19. A method of monitoring electrical power supply outages to a computer, said method comprising the steps of:

providing a counter device having an on state during which it generates an incrementing count value, and an off state during which said count value remains constant;

changing the state of said counter device from a selected first one of said on and off states to the other of said on and off states in response to a CPU unit electrical supply outage; and changing the state of said counter device back to said first one of said on and off states, determining the count value of said counter device, and then using the determined count value to generate CPU unit power outage downtime information, in response to a resumption in CPU unit electrical power supply.

20. The method of claim 19 wherein said step of using the determined count value to generate CPU unit power outage downtime information includes the step of generating data indicative of the onset and duration times of the previous power outage.

21. The method of claim 19 wherein said counter device is electrically powerable and said state-changing steps are performed by supplying electrical power to said counter device only during an outage of electrical power supply to the computer.

22. The method of claim 19 wherein:

said method further comprises the step of providing a system clock operative to generate a time stamp subsequent to said resumption in CPU unit electrical power supply, and said step of using the determined count value to generate CPU unit power outage downtime information includes the step of correlating in a predetermined manner the determined count value with the time value of said time stamp.

23. For use with a computer having at least one nonvolatile storage device incorporated therein, the computer being in an operating state during receipt of electrical operating power from a source thereof, and in a power outage state during an outage of the electrical operating power, a nonintrusive method of monitoring electrical power supply outages to the computer without polling any of said at least one nonvolatile storage device during the operating state of the computer, said method comprising the steps of:

generating an incrementing count value during a selected one of the operating and power outage states of the computer, and then determining the count value, and using it to compute and generate said downtime information, during a subsequent one of said operating and power outage states of the computer.

24. The method of claim 23 wherein said generating step is performed using a software-controlled counter device.

25. The method of claim 24 wherein said generating step is performed using a software-controlled digital counter.

26. The method of claim 24 wherein said generating step is performed using a software-controlled real time clock.

27. The method of claim 23 wherein said generating step is performed during said operating state of said computer.

28. The method of claim 23 wherein said generating step is performed during said power outage state of the computer.

29. The method of claim 23 wherein said step of using the determined count value to compute and generate said downtime information includes the generation of data indicative of the onset and duration times of a power outage state of the computer.

30. The method of claim 23 wherein:

the computer has a system clock operative to generate a time stamp subsequent to the return of the computer to its operating state from its power outage state, and said step of using the determined count value includes the step of correlating in a predetermined manner the determined count value with the time value of said time stamp.

* * * * *